United States Patent

Sepp

[11] Patent Number: 5,612,503
[45] Date of Patent: Mar. 18, 1997

[54] LASER WEAPON SYSTEM

[75] Inventor: Gunther Sepp, Ottobrunn, Germany

[73] Assignee: Daimler-Benz Aerospace AG, Germany

[21] Appl. No.: 574,441

[22] Filed: Dec. 15, 1995

[30] Foreign Application Priority Data

Dec. 15, 1994 [DE] Germany ............... 44 44 637.3

[51] Int. Cl.⁶ ....................................... F41B 15/00
[52] U.S. Cl. ............................................. 89/1.11
[58] Field of Search .................. 89/1.11, 41.05, 89/41.06; 42/103; 250/203.1, 203.2; 348/143; 362/259

[56] References Cited

U.S. PATENT DOCUMENTS

| | | | |
|---|---|---|---|
| 3,641,261 | 2/1972 | Chaplin et al. | 89/41.05 |
| 3,711,638 | 1/1973 | Davies | 89/41.05 |
| 3,732,412 | 5/1973 | Tyroler | 89/1.11 |
| 3,946,233 | 3/1976 | Erben et al. | 89/1.11 |
| 4,169,663 | 10/1972 | Murr | 250/203.1 |
| 4,287,410 | 9/1981 | Crane et al. | 250/203.1 |
| 4,290,757 | 9/1981 | Marshall et al. | 434/12 |
| 5,285,273 | 2/1994 | James et al. | 89/41.05 |
| 5,456,157 | 10/1995 | Lougheed et al. | 89/134 |
| 5,473,501 | 12/1995 | Claypool | 89/1.11 |

OTHER PUBLICATIONS

"Non–Lethal Technologies Enhance Warrior's Punch", National DEFENSE, Dec. 1993, pp. 26–29.

Primary Examiner—Michael J. Carone
Assistant Examiner—Theresa M. Wesson
Attorney, Agent, or Firm—Evenson, McKeown, Edwards & Lenahan P.L.L.C.

[57] ABSTRACT

Laser weapon system whose laser device is a target reconnaissance system with a visual device, rangefinding and exposure measuring devices, and a control computer for adjusting the laser energy, with the laser device being associated with a beam-aiming unit and with the viewer being associated with a monitor as well as an image processing unit provided with a marking and tracking device for the target individuals.

8 Claims, 1 Drawing Sheet

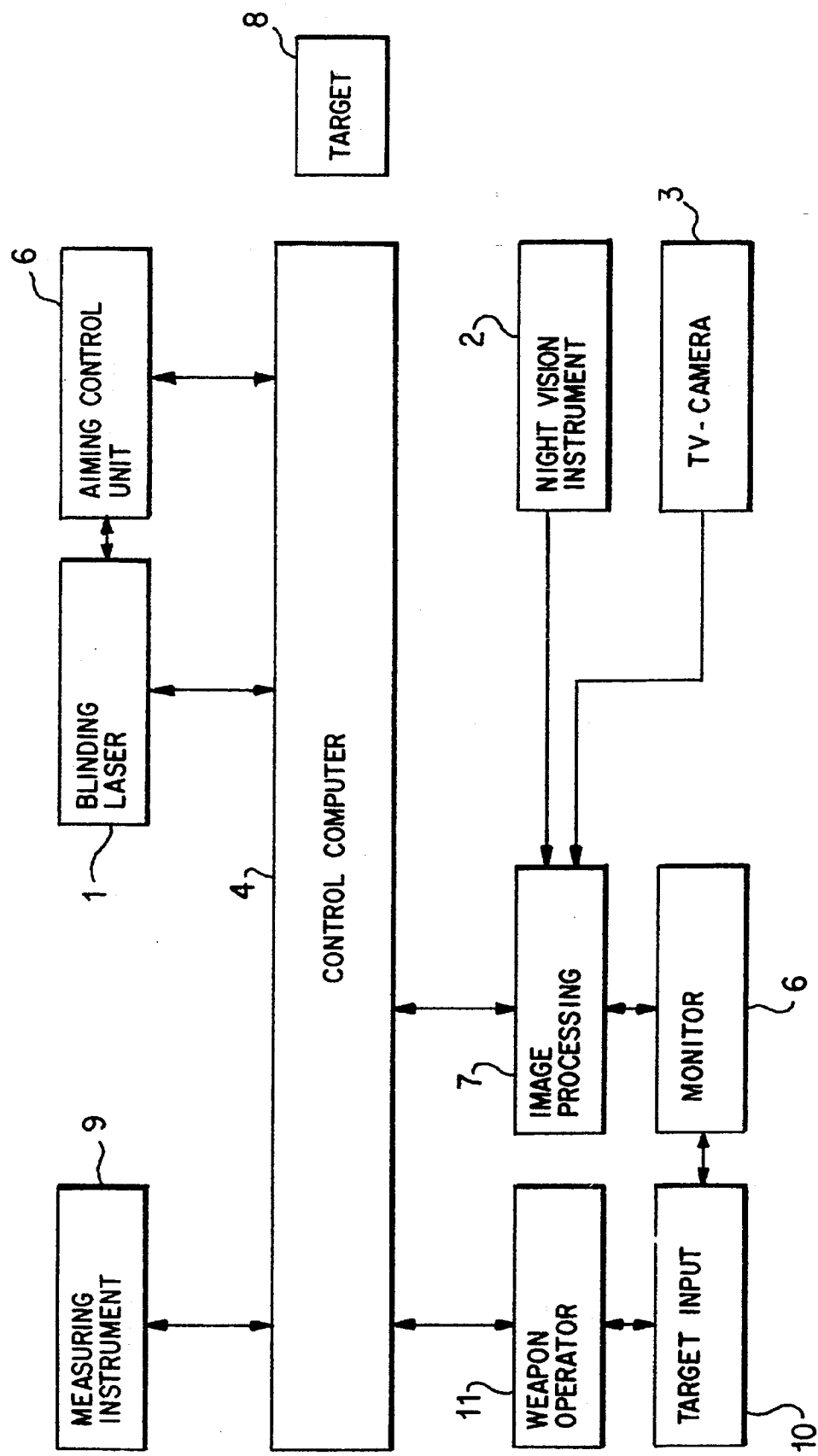

LASER WEAPON SYSTEM

BACKGROUND AND SUMMARY OF THE INVENTION

The invention relates to a nonlethal laser weapon system which temporarily blinds target individuals.

Laser weapon systems, as such, are known. Such systems are predominantly operated with conventional high-powered lasers, and in all cases are at least potentially lethal. Although nonlethal weapon systems in general, such as water cannons, rubber bullets, gas spray cans, cattle prods, are known, nonlethal precision weapon systems with lasers have not been known heretofore.

The object of the present invention is to provide a nonlethal laser weapon system that can be used to blind temporarily a great many persons who are present simultaneously, such as a group of rioters, in such a way that the blinding effect lasts for only a limited time period, and which is reversible; in other words, it causes no permanent injury.

This object is achieved by the nonlethal weapon system according to the invention, in which a computer is used to aim and control a laser beam, guiding it sequentially to a series of targeted individuals and at the same time adjusting the intensity of the laser beam to a level which is suitable for temporarily blinding them, based on target range and other target parameters. Targeting is performed by means of a marking system, such as a mouse or touchscreen, using a conventional video monitor and television or night viewing instruments.

Other objects, advantages and novel features of the present invention will become apparent from the following detailed description of the invention when considered in conjunction with the accompanying drawings.

BRIEF DESCRIPTION OF THE DRAWING

The Figure of the drawing shows a block diagram which illustrates the components of the laser weapon system according to the invention.

DETAILED DESCRIPTION OF THE DRAWING

As shown in the Figure, the weapon system according to the invention is provided with a laser 1 suitable for use as a blinding laser, for example a frequency-doubling Nd-YAG solid state pulsed laser or a diode laser that continuously radiates in the visible spectrum, and with a target reconnaissance system, including a viewer (for example, a television 3 or night-vision camera 2), as well as conventional rangefinders and exposure meters 9. A control computer 4 adjusts the laser energy to a level which is satisfactory for reversible blinding.

The intensity or energy level of laser radiation which is satisfactory to achieve temporary blinding, without permanent damage to the eyes, depends on a number of factors. Using a pulsed laser with a wavelength of 0.53 µm, and a pulse length of 10 ns, the following parameters are applicable:

| | |
|---|---|
| ANSI Laser Safety Standard | MAX. 0.2 µJ |
| Blinding (night-adapted eye) | <1 µJ |
| Blinding (day-adapted eye) | ≦3 µJ |
| Minimal Lesion | 3 µJ |
| Hemorrhage (bleeding of the eyes) | 8–150 µJ |

Thus, it can be seen that in order to achieve temporary blindness without permanent damage to the eyes a laser intensity in the range of 1 to 3 µJ is generally required. In addition, however, other factors must be taken into account as follows:

| | | |
|---|---|---|
| Distance | -> | attenuation of intensity because of beam spread and atmosphere. |
| Light Intensity | -> | binoculars collect with a large aperture and focus laser light on the eye. |
| Transmission | -> | according to their transmission, sunglasses reduce the laser beam by approximately 10%–90%. |
| Target Brightness | -> | influences the size of the pupil of the target person and thus the laser radiation arriving in the eye. |
| Visual Range | -> | is correlated with the transmission of the propagation path and permits calculation of the attenuation of the laser beam. |
| Turbulence | -> | the variation range of the intensity fluctuations of the laser beam at the target can be calculated from the turbulence intensity so that an irreversible damage to the eye by turbulence-caused statistical magnification of the laser intensity can be avoided. |
| Disturbance of the Line of Sight | -> | reduces the transmission of the laser radiation, for example, by individual leaves of ground vegetation, etc. |

For selecting the "correct" laser parameters, target reconnaissance is required; that is, a determination of relevant target and environmental parameters, which can take place by measuring or estimating. In addition to the most important target parameter, specifically the distance of the target person, it must be determined whether the target person is looking with the naked eye or through binoculars, which influence the light intensity. The transmission of any sunglasses influencing the laser radiation must also be assessed.

With respect to environmental parameters, the light conditions determining the eye adaption (opening of the pupils), as well as the meteorological visual distance and the turbulence of the atmosphere from the laser to the target person must be determined, since the transmission and the intensity fluctuation of the laser radiation are influenced by these factors. The presence of an undisturbed and free line of sight, or of leaves situated in the line of sight, or of window glass behind which the target person is standing, must also be assessed.

These parameters may be assessed either by the weapon operator by observing by means of the naked eye and through the target device or may be determined conventionally by measuring instruments. The target distance may be determined, for example, by means of a distance meter; the visual distance may be determined as a function of the distance by means of contrast measurements; and the light conditions may be determined by means of a light meter.

It is advantageous that the intra-ocular exposure to be achieved, and the laser beam diameter in the target distance, are determined by the weapon operator and fed to the control computer. Thus, the intensity of the blinding of the eyes and the safety margin of the laser energy with respect to an irreversible damage to the eyes can be adapted to the prevailing circumstances. Furthermore, it may be achieved in this manner, for example, that the laser beam blinds only one or several selected target individuals, but that the persons standing near the target individuals are not blinded. In this manner, it can also be ensured, particularly in the case of small target distances, that both eyes of the target person are blinded.

These above-mentioned target reconnaissance values are fed to the control computer—which may, for example, be a small hand held computer. This takes place preferably automatically if the target reconnaissance values were determined by means of measuring instruments, and by the operator, if these are his estimated values or the desired laser beam diameter. Therefrom, the control computer computes the laser parameters required for the blinding of the eyes in a known manner, and sets and controls these automatically; that is, the beam spread by means of the transmission lens system; the individual pulse or the pulse sequence and the pulse energy of the "laser shot" to be fired by the shooter, as required.

For this purpose, the control computer first computes the opening of the pupils of the target person, which is to be expected on the basis of the measured light conditions. It then determines from the intra-ocular exposure to be achieved and the desired laser beam diameter at the target, the energy density for an individual pulse of the laser to be achieved there. In this case, it may take into account the values fed by the operator for light intensity, the effect of binoculars used by the target person or of the transmission of his sun glasses. Using the values of the target distance and of the visual distance, the control computer then computes the transmission of the propagation path from the laser to the target person, and from that the energy of the laser pulse to be radiated. If this energy is higher than the maximal individual pulse energy of the laser, it computes the number of the pulses required for the desired blinding effect and their pulse energy, in which case it takes into account the known dependence of the damage threshold on the pulse number. If the pulse energy can be adjusted only in discrete steps, for example, by means of reducers, the control computer computes a corresponding correction of the beam spread for a precise control. Furthermore, it takes into account that, corresponding to the fed turbulence intensity along the propagation path of the laser beam, the required pulse energy must be lowered in order to maintain the desired safety margin of the laser energy with respect to an irreversible damage to the eyes, despite the turbulence-caused possible short-term higher laser energy density at the target.

When a laser diode array is used as the source, the control computer computes in an analogous manner the intra-ocular exposure to be achieved for continuous lasers of this wavelength, as well as the other described relevant parameters, and from them determines the laser power to be radiated and the duration of the irradiation. In this case, it again determines the known dependence of the damage threshold on the wave length, power and duration of the irradiation.

In order to combat multiple targets simultaneously, the system described above is additionally equipped with a laser beam aiming control unit 5 for the blinding laser and the viewer and/or camera 3, 4 is associated with a monitor 6 as well as an image processing unit 7, which includes a device for tracking the targets to be irradiated.

The following is an example of the operation of the nonlethal laser weapon system according to the invention. In the presence of a group of rioters, the weapon operator 11 observes the crowd on the television or night-vision monitor 6, and notes the heads of the leaders or other prominent individuals. Using the target input 10, the operator then selects in the crowd the "irradiation targets" 8 that he deems necessary from the monitor 6, and marks them with a conventional marking device, such as a mouse, touch screen, or the like. Thereafter, the system's image processing unit constantly follows the marked heads and the visibility of their eyes using known image processing techniques.

For example, a tracking window may be placed around the target which is larger than the target; that is, it contains the target as well as the background. The different contents of two successive images respectively of the tracker are analyzed by conventional methods of image processing in such a manner that they are divided into the moving target and the constant background. The resulting movement of the target is used for panning the tracker.

At the same time the system-integral target reconnaissance system 9 determines the required laser energy for reversible blinding of at least one irradiation target 8. From the range and direction of this one irradiation target, the image processing unit then extrapolates the ranges and directions of the other marked targets, and at the same time the control computer 4 determines the corresponding laser energies, while the vulnerability of the irradiation targets is displayed on the monitor. For this purpose, the image processor 7 determines when the eyes of these persons are exposed, using conventional image processing techniques based on the orientation of targets recognized as human faces, and notes this information accordingly. (The control computer 4 of the blinding laser system 1 with semiautomatic or fully automatic laser energy adjustment attributes irradiation values to the individual markings.)

The weapon operator chooses a suitable moment to activate the blinding laser system, whereupon the control computer 4 directs the laser beam by means of the aiming unit 5 sequentially at each of the marked targets, in this case the heads of the targeted individuals with exposed eyes, and controls the blinding laser accordingly with the appropriate laser energies. In a preferred embodiment, the image processing unit 7 determines which target individuals are wearing sunglasses, or other eyeglasses and adjusts the control computer 4 for the appropriate amount of laser energy to be transmitted in such cases.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A nonlethal laser weapon system comprising:

a laser beam generator;

a target reconnaissance system comprising an imaging instrument for acquiring an image which includes potential target individuals, image processing apparatus, a monitor for displaying said image, means for selecting target individuals in said image and means for tracking target individuals after selection thereof;

target sensor units for detecting at least a range and illumination of target individuals;

an aiming control unit for directing a laser beam from said laser beam generator at a target individual's head; and a control computer for controlling said aiming control unit to direct said laser beam sequentially at heads of selected target individuals, and for adjusting intensity of said laser beam to reversibly blind said target individuals;

wherein said image processing unit includes means for determining when eyes of target individuals are exposed in a direction of said laser beam.

2. Laser weapon system according to claim 1 wherein the image processing unit continuously tracks target individuals and continuously determines and indicates the visibility of their eyes.

3. Laser weapon system according to claim 1 wherein the control computer determines for at least one irradiation target an amount of laser energy required for reversible blinding.

4. Laser weapon system according to claim 1 wherein the image processing unit extrapolates range and direction of target individuals relative to range and direction of one of said target individuals.

5. Laser weapon system according to claim 1 wherein the control computer determines corresponding laser energies for each of said target individuals and displays the vulnerability of these irradiation targets on the monitor.

6. Laser weapon system according to claim 1 wherein a weapon operator activates the laser, and thereafter the control computer aims the laser beam by means of the aiming control unit sequentially at those marked irradiation targets whose eyes are exposed to the laser beam, and supplies the laser with the amount of laser energy required.

7. Laser weapon system according to claim 1 wherein the image processing unit identifies target individuals who are wearing glasses and feeds appropriate signals to the control computer to adjust the laser energy.

8. Laser weapon system according to claim 1 wherein the imaging instrument is a television/night-vision unit.

* * * * *